Dec. 12, 1950     A. E. GERSCH     2,533,730
VARIABLE CAPACITY CONDENSER

Filed Dec. 8, 1948     2 Sheets-Sheet 1

INVENTOR.
ADOLPH E. GERSCH
BY
James and Franklin
ATTORNEYS.

Dec. 12, 1950  A. E. GERSCH  2,533,730
VARIABLE CAPACITY CONDENSER
Filed Dec. 8, 1948  2 Sheets-Sheet 2

INVENTOR.
ADOLPH E. GERSCH
BY
*James and Franklin*
ATTORNEYS.

Patented Dec. 12, 1950

2,533,730

UNITED STATES PATENT OFFICE 2,533,730

VARIABLE CAPACITY CONDENSER

Adolph E. Gersch, Boonton, N. J., assignor to General Instrument Corporation, Elizabeth, N. J., a corporation of New Jersey Application December 8, 1948, Serial No. 64,080

16 Claims. (Cl. 175—41.5)

The present invention relates to a novel type of variable condenser particularly resistant to vibration effects.

Variable condensers of the trimmer type must be small and accurate even though they may be used in applications which are subjected to extreme vibratory or shock conditions. One type of variable condenser which has been used to a limited extent in various applications includes sets of partial-cylindrical type interleaving plates, one set being rotatable with respect to the other so as to vary the degree of interleaving and consequently vary the capacitance of the condenser, the greater the degree of interleaving the greater the capacitance. While accurate initial control of the capacitance may be achieved with condensers of this type, such condensers have not received very ready acceptance in the field, particularly insofar as small units are concerned, because with small units the plates must be small and light, and by that very token their resistance to vibration and shock is minimal. If the condenser is subjected to vibration, the free ends of the relatively flimsy condenser plates will themselves vibrate, thus varying the spacing between the plates and hence varying the capacitance of the condenser, and if the vibration is sufficiently marked or if the unit is subjected to a particularly severe shock, one plate might touch its adjacent plate. In order to eliminate these objectionable features, the art in this type of condenser construction has turned to plates of massive character, but such an expedient completely eliminates or at least greatly minimizes the adaptability of condensers of this type for trimmer applications. Today when weight and size are prime considerations in the design of all communications equipment, whether it be for use in military applications or in commercial sets, and where particularly in commercial applications an additional cost of only a fraction of a cent per unit is an important competitive factor, the use of condensers employing arcuate plates has therefore been extremely limited.

It is the prime object of the present invention to devise a rotary variable capacity condenser employing partial-cylindrical type condenser plates which may be made extremely small and light yet which at the same time is accurate and constant in capacity once that capacity has been adjusted to the desired value.

Another object of the invention is to devise such a condenser in which the projecting free ends of the rotor and stator plates are supported against vibration.

A further object of the present invention is to devise a rotary variable capacity condenser having a support for rotor plates and a support for stator plates, the free ends of the stator plates being guided and supported by the rotor support and the free ends of the rotor plates being guided and supported by the stator support.

Yet another object of the present invention is to devise a condenser in which the plates are secured to their respective supports in a novel and convenient manner which facilitates assembly and decreases cost.

A further object of the present invention is to devise such a condenser in which the means for securing the plates to their respective supports also functions as an electrical connection thereto.

A more generalized object of the present invention is to devise a novel type of rotary variable capacity condenser which is easily assembled from parts all susceptible of low cost, quantity production, which condenser may be of extremely small size, low weight, and great accuracy.

To the accomplishment of the foregoing objects and such other objects as may hereinafter appear, the present invention relates to a rotary variable capacity condenser construction as defined in the appended claims and as described in this specification, taken together with the accompanying drawings, in which:

Figure 1:
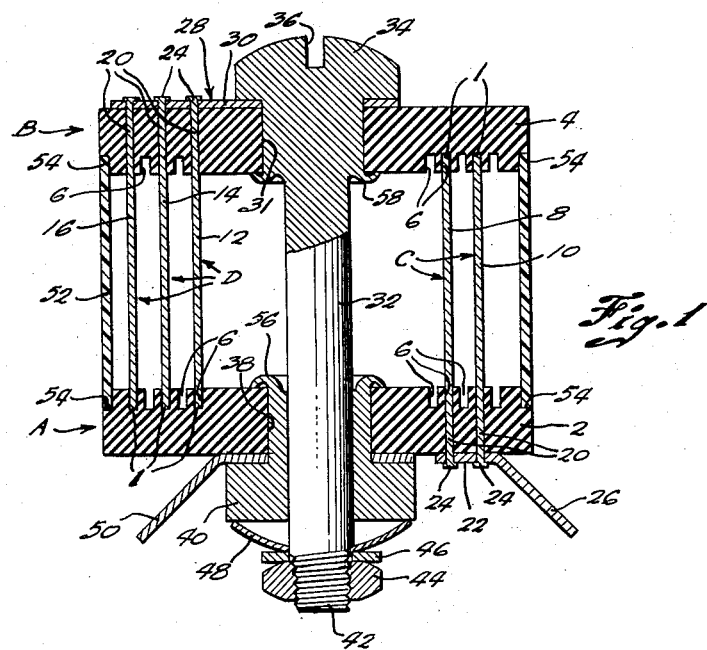
Fig. 1 is a side cross-sectional view of one embodiment of the condenser of the present invention.
Figures 2, 3:
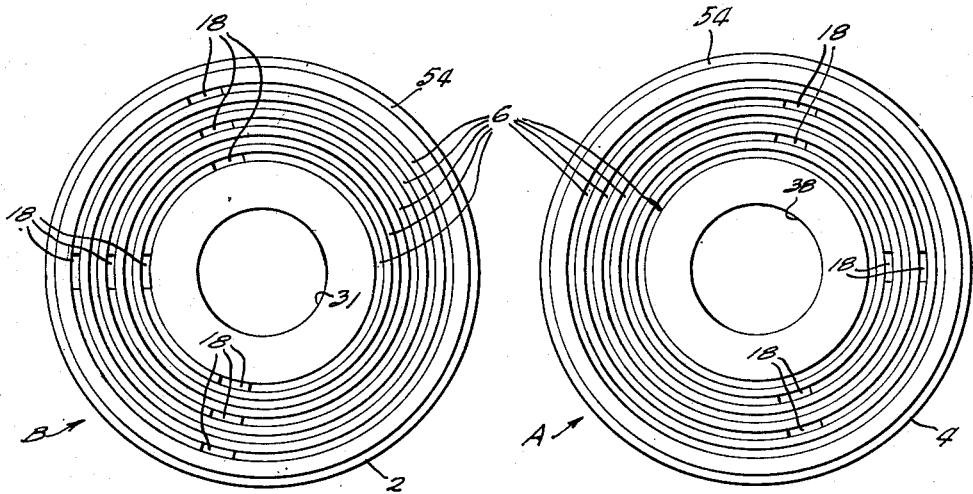
Fig. 2 is a bottom view of the rotor support.
Fig. 3 is a top view of the stator support.

The condenser comprises an insulating stator support generally designated A and an insulating rotor support generally designated B, the latter being rotatable with respect to the former. A plurality of partial-cylindrical type stator plates generally designated C, here shown as two in number, are secured to the stator support A and a plurality of partial-cylindrical type rotor plates generally designated D, here shown as three in number, are secured to the rotor support B so as to be movable into positions of progressive interleaving with respect to the stator plates C, the plates not coming into contact with one another but being spaced radially one from the other a predetermined amount. The capacitance of the condenser is determined by the degree of interleaving, that is to say, the capacitance will be at a minimum when the rotor plates D are completely removed from interleaving condition with respect to the stator plates C and the capacitance will be at a maximum when the rotor plates D are completely interleaved between the stator plates C. Hence the arcuate extent of each of the plates C and D is 180° or less.

The stator and rotor supports A and B are positioned opposite one another and the stator and rotor plates C and D secured respectively to the stator and rotor supports A and B project toward the rotor and stator supports B and A respectively. The projecting edges of the stator and rotor plates C and D are engaged respectively by the rotor and stator supports B and A, the engagement being of such a nature as to prevent vibration of the plates C and D and thus prevent their displacement toward one another when the condenser is subjected to vibration or shock, while at the same time not to inhibit the rotative motion of the rotor support B with respect to the stator support A, which rotative motion permits variation of the capacitance of the condenser.

In the form here specifically disclosed, the stator and rotor supports A and B may be in the form of discs 2 and 4 of some suitable insulating material such as Mycalex or ceramic. Both the stator and rotor supports A and B have, on their opposing surfaces, a plurality of spaced concentric circular grooves 6, each of the grooves 6 on the stator support A being preferably positioned directly opposite a corresponding groove 6 on the rotor support B. The width of the groove corresponds to the thickness of the stator and rotor plates C and D respectively. These plates may be made of silver plated brass having a thickness of .020 of an inch and the spacing between the grooves may be on the order of .008 of an inch. Each of the plates C and D is arcuate in form and is so curved as to correspond to the curvature of the groove 6 into which it is designed to fit. Thus, the first stator plate 8 fits into the second groove 6 (all grooves and plates will be designated in order counting from the center of the stator or rotor support A or B, as the case may be) while the second stator plate 10 fits into the fourth groove 6. The first rotor plate 12 fits into the first groove 6 on the rotor support 4, the second rotor plate 14 fits into the third groove 6, and the third rotor plate 16 fits into the fifth groove 6.

The stator plates 8 and 10 are secured to the stator support A and the rotor plates 12, 14 and 16 are secured to the rotor support B in a manner hereafter to be described. Once the plates have been thus secured, the edges 1 of the stator plates C will project toward the rotor support B and the edges 1 of the rotor plates D will project toward the stator support A. In order to prevent vibration of the plates, these projecting edges of the plates are slidably received inside the unoccupied grooves on the supports toward which they project. Thus, the stator plates C which are secured within the even grooves on the stator support A have their projecting ends 1 receivable within the even grooves in the rotor support B, whereas the rotor plates D which are secured within the odd grooves in the rotor support B, have their projecting ends 1 slidably received within the odd grooves in the stator support A. When the rotor support B is rotated with respect to the stator support A so as to cause greater or less interleaving between the plates C and D, thus varying the capacitance of the condenser, the plates will therefore be supported at both ends and hence will not be subject to vibration to any considerable degree, and this even through the plates themselves are structurally relatively thin and flimsy.

In order to assist in assembling the device and making electrical connection to the requisite plates, the grooves in the stator support A into which the stator plates C are received, that is to say, the even numbered grooves, are provided with one or more apertures 18 extending through the insulating disc 2 to the other side thereof and the odd numbered grooves 6 in the rotor support B are similarly provided with one or more apertures 18. The stator plates 8 and 10 are provided with projecting portions 20 in the form of lugs adapted to fit snugly within and project through the apertures 18 in the stator support A and the rotor plates D are similarly provided with projecting portions 20. An arcuate conductive element 22 is positioned on the outer (bottom) side of the stator support A and engages with the projecting portions 20 of the plates 8 and 10. This engagement may be achieved through soldering of the projecting portions 20 to the conductive element 22 or, as is best shown in Fig. 1, by providing the conductive element 22 with apertures through which the projecting portions 20 are passable, the projecting portions 20 then being peened over as shown at 24. A terminal lug 26 is connected to the conductive element 22 and may, as shown, be formed integrally therewith. It will therefore be apparent that the conductive element 22 not only provides for electrical connection between the terminal 26 and the stator plates 8 and 10 but also serves to secure the plates 8 and 10 to the stator support A, and to achieve that securing in such a manner that the securing operation may be conveniently performed from the exterior of the condenser, thus facilitating assembly of the condenser.

Figure 4:
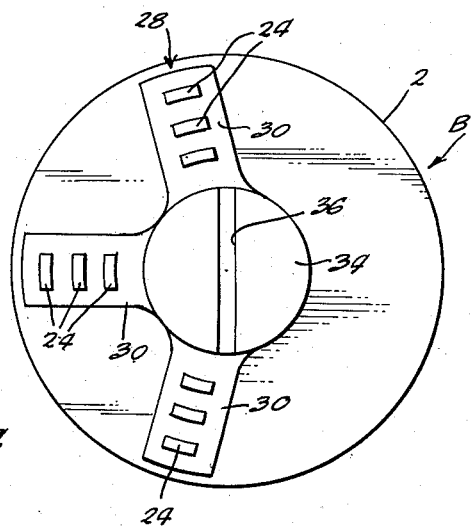
Fig. 4 is a top view of Fig. 1.
Figure 5:
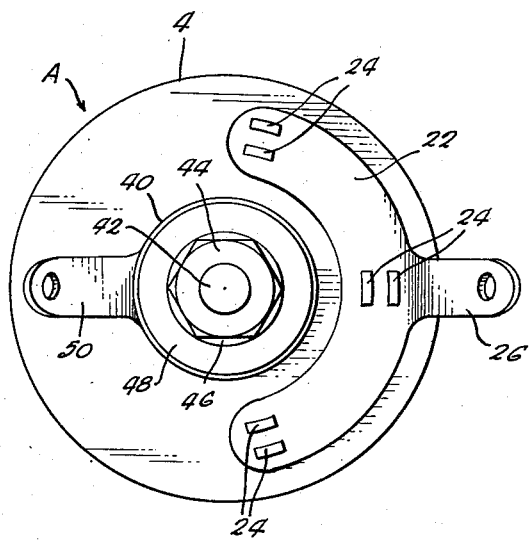
Fig. 5 is a bottom view of Fig. 1.

A conductive element 28 which may take the form of a spider having a plurality of legs 30 (see Fig. 4) is adapted to receive and engage with the projecting portions 20 of the rotor plates 12, 14 and 16. The central portion of the insulating rotor support B is apertured at 31 and a conductive shaft 32 is secured thereto, the shaft terminating at its upper portion in a head 34 having a slot 36 so that the shaft may be rotated, the conductive element 28 making electrical contact with the conductive shaft 32 preferably by being secured between the head 34 of the shaft 32 and the outer (upper) surface of the rotor support B.

The stator support A is also centrally apertured as at 38, and a conductive bushing 40 is secured thereto, the shaft 32 passing through the bushing 40 and being rotatable therein while at the same time making electrical connection therewith. The shaft 32 has a tip portion 42 which projects well through the bushing 40, a nut 44 and a washer 46 being securable to the tip and a resilient element in the form of a spring washer 48 being active between the washer 46 and the bushing 40 so as to draw the shaft 32 downwardly in Fig. 1 and thus maintain the condenser in assembled condition, the force of the spring 48 tending to keep the free ends of the stator and rotor plates C and D slidably received within the appropriate grooves 6 in the rotor and stator supports A and B respectively. A terminal 50 is electrically connected to the shaft 32, preferably by being secured between the conductive bushing 40 and the outer surface of the stator support A. By this means, electrical connection to the rotor plates D is made from the terminal 50 via the conductive bushing 40, the conductive shaft 32, and the conductive element 28.

In order to keep the interior of the condenser clean of external particles such as dust and also in order to prevent the collection of moisture therein, a shield 52 is disposed around the stator and rotor plates C and D. To this end, both the stator and rotor supports A and B are provided with a groove 54 outwardly disposed with respect to the grooves 6 in which the stator and rotor plates C and D are received, the upper and lower edges of the shield 52, which may be of lucite, glass or the like, being received inside the grooves 54. The shield 52 may be secured, for example by means of adhesive, in one of the grooves 54 so as to slide within the other, or the shield 52 may be retained in the grooves 54 merely by the force exerted by the spring washer 48. In addition to serving as a shield to prevent the entry into the condenser of foreign material, the shield 52 also preferably serves as the main longitudinal structural element of the condenser, defining the spacing between the stator and rotor supports A and B and taking up all or most of the tension exerted by the spring 48. In this way, the stator and rotor plates C and D, while their projecting ends 1 are received within the grooves 6 in the rotor and stator supports B and A respectively, are not tightly compressed therein and consequently are not subjected to any compressive forces which might tend to cause them, because of their relatively flimsy construction, to bend or bow and thus mar the accurate spacing between the plates.

The manner of assembly of the condenser will in the main be fully apparent from the above description. The stator and rotor units may be assembled separately. Assembly of the stator unit involves fitting the bushing 40 into the aperture 38, the terminal 50 first being interposed between the bushing 40 and the lower surface of the stator support A. The upper end 56 of the bushing 40 is then spun over, the stator plates C are inserted into the even grooves 6 so that their projecting portions 20 pass through the apertures 18, the conductive element 22 is placed over the projecting portions 20 of the stator plates C, and the projecting portions 22 are then peened over as at 24, thus securing the conductive element 22 and the plates C to the stator support A. The dust shield 52 may then be secured in the groove 54 in the stator support A as by the use of adhesive. However, it is not necessary that the shield 52 be secured either to the stator or rotor supports A or B, since the force exerted by the spring 48 will serve to keep it in position. The rotor section is assembled by inserting the rotor plates D in the odd grooves 6 so that their projecting portions 20 pass through the apertures 18, in then placing the conductive element 28 over the support B so that the projecting portions 20 of the plates D pass through the arms 30, and in then peening over the projecting portions 20 as at 24 so as to secure both the plates D and the conductive element 28 to the rotor support B. The conductive shaft 32 is then inserted through the aperture 30 in the support B and the inner portion is peened over as at 58.

The rotor and stator units are then assembled by placing the dust shield 52 in position and by passing the projecting portion of the shaft 32 through the bushing 40. The spring 48 is slipped over the projecting portion and the washer 46 and nut 44 are placed in position, the nut being screwed down until the spring 48 exerts sufficient tension to cause the parts to come into their proper relationship.

In order to vary the capacitance of the condenser it is merely necessary to insert a screwdriver or other tool into the slot 36 in the head 34 of the shaft 32 and rotate the same until the desired degree of interleaving between the stator and rotor plates C and D has been achieved.

Because of the structure described, a very small unit can be made which is particularly suitable for use as a trimmer condenser in various communications or other electrical circuits. The unit can be made very small, having an over-all width of .8 inch and an over-all height of approximately the same amount. When such a small size is achieved, the condenser plates C and D are small and flimsy but because of the manner in which they are mounted, and particularly because their projecting ends are supported against vibration, the condenser is quite accurate and extremely resistant to vibration and shock.

In addition, because of the details of construction, the various component parts of the condenser may be simply manufactured on a mass production basis and may be quickly and conveniently assembled by relatively unskilled personnel. The entire condenser is inexpensive, dependable, and is considerably more pleasing in appearance than other types of trimmer condensers.

It will be apparent that, while only one embodiment of the present invention has been here disclosed, many variations may be made in the detailed construction thereof, all within the spirit of the invention as defined in the following claims.

I claim:

1. A variable capacity condenser comprising an insulating stator support having an arcuate groove on one side thereof, a partial-cylindrical type stator plate having arcuate cross section secured thereto adjacent said groove, a portion of said stator plate projecting through said stator support to the opposite side thereof, a conductive element secured to said portion, a conductive shaft mounted in said stator support, an insulating rotor support on said shaft opposite said stator support, a partial-cylindrical type rotor plate having an arcuate cross section secured to said rotor support opposite the groove in said stator support, a portion of said rotor plate projecting through said rotor support, a conductive element connecting said shaft with said portion, and said rotor support having an arcuate groove opposite said stator plate, said shaft, arcuate grooves and plates being concentric, the ends of said rotor and stator plates directed toward said stator and rotor supports respectively being slidably received within the grooves in said supports, both the rotor and stator plates thus being fixed in position at both ends and rendered vibration-resistant, a cylindrical dust shield between said stator and rotor supports outside said stator and rotor plates, and a resilient element operatively connected to said supports so as to urge them toward one another, said dust shield having a height such as to serve as the primary longitudinal structural element of the condenser, rigidly determining the spacing between said supports and relieving pressure on said stator and rotor plates.

2. The variable capacity condenser of claim 1, in which said shaft extends through and beyond said stator support and in which said resilient element is positioned between said stator support and the tip of the extending portion of said shaft.

3. A variable capacity condenser comprising an insulating stator support having an arcuate groove on one side thereof, a partial-cylindrical type stator plate having an arcuate cross section secured thereto adjacent said groove, a portion of said stator plate projecting through said stator support to the opposite side thereof, a conductive element secured to said portion, a terminal electrically connected to said conductive element, a conductive shaft mounted in said stator support, an insulating rotor support on said shaft opposite said stator support, a partial-cylindrical type rotor plate having an arcuate cross section secured to said rotor support opposite the groove in said stator support, a portion of said rotor plate projecting through said rotor support, a conductive element connecting said shaft with said portion, a terminal fixedly mounted on said stator support and electrically connected to said shaft, and said rotor support having an arcuate groove opposite said stator plate, said shaft, arcuate grooves and plates being concentric, the ends of said rotor and stator plates directed toward said stator and rotor supports respectively being slidably received within the grooves in said supports, both the rotor and stator plates thus being fixed in position at both ends and rendered vibration-resistant.

4. A variable capacity condenser comprising an insulating stator support having a pair of adjacent arcuate grooves on one side thereof and having apertures extending from one of said grooves through said stator support, a partial-cylindrical type stator plate having an arcuate cross section having projecting portions at one end thereof positioned in said one of said grooves so that said projecting portions extend through said apertures, a conductive element secured to said projecting portions so as to make electrical connection therewith and at the same time secure said stator plate to said stator support, a conductive shaft mounted in said stator support, an insulating rotor support on said shaft opposite said stator support and having a pair of arcuate grooves in the side of said rotor support facing said stator support and having apertures in one of said grooves extending through said rotor support to the opposite side thereof, said grooves in said rotor support being positioned opposite said grooves in said stator support and the groove in said rotor support from which said apertures extend being opposite the groove in said stator support not provided with apertures, a partial-cylindrical type rotor plate having an arcuate cross section received within the apertured groove in said rotor support and having projecting portions extending through said apertures to the opposite side of said rotor support, a conductive element secured to the projecting portions of said rotor plate so as to make electrical connection therewith and at the same time secure said rotor plate to said rotor support, said conductive element being electrically connected to said shaft, said shaft, arcuate grooves and plates being concentric, the ends of said rotor and stator plates directed toward said stator and rotor supports respectively being slidably received within the grooves in said supports, both the rotor and stator plates thus being fixed in position at both ends and rendered vibration-resistant.

5. A variable capacity condenser comprising an insulating stator support having a pair of adjacent arcuate grooves on one side thereof and having apertures extending from one of said grooves through said stator support, a partial-cylindrical type stator plate having an arcuate cross section having projecting portions at one end thereof positioned in said one of said grooves so that said projecting portions extend through said apertures, a conductive element secured to said projecting portions so as to make electrical connection therewith and at the same time secure said stator plate to said stator support, a conductive shaft mounted in said stator support, an insulating rotor support on said shaft opposite said stator support and having a pair of arcuate grooves in the side of said rotor support facing said stator support and having apertures in one of said grooves extending through said rotor support to the opposite side thereof, said grooves in said rotor support being positioned opposite said grooves in said stator support and the groove in said rotor support from which said apertures extend being opposite the groove in said stator support not provided with apertures, and a partial-cylindrical type rotor plate having an arcuate cross section received within the apertured groove in said rotor support and having projecting portions extending through said apertures to the opposite side of said rotor support, a conductive element secured to the projecting portions of said rotor plate so as to make electrical connection therewith and at the same time secure said rotor plate to said rotor support, said conductive element being electrically connected to said shaft, said shaft, arcuate grooves and plates being concentric, the ends of said rotor and stator plates directed toward said stator and rotor supports respectively being slidably received within the grooves in said supports, both the rotor and stator plates thus being fixed in position at both ends, a terminal secured to the conductive element electrically connected to the projecting portions of said stator plate and a terminal fixedly mounted on said stator support and electrically connected to said conductive shaft but not rotatable therewith.

6. A variable capacity condenser comprising an insulating stator support having a pair of adjacent arcuate grooves on one side thereof and having apertures extending from one of said grooves through said stator support, a partial-cylindrical type stator plate having an arcuate cross section having projecting portions at one end thereof positioned in said one of said grooves so that said projecting portions extend through said apertures, a conductive element secured to said projecting portions so as to make electrical connection therewith and at the same time secure said stator plate to said stator support, a conductive bushing non-rotatably secured to said stator support, a terminal fixedly mounted on said stator support and electrically connected to said bushing, a conductive shaft mounted in said bushing, an insulating rotor support on said shaft and having a pair of arcuate grooves in the side of said rotor support opposite said stator support and having apertures in one of said grooves extending through said rotor support to the opposite side thereof, said grooves in said rotor support being positioned opposite said grooves in said stator support and the groove in said rotor support from which said apertures extend being opposite the groove in said stator support not provided with apertures, a partial-cylindrical type rotor plate having an arcuate cross section received within the apertured groove in said rotor support and having projecting portions extending through said apertures to the opposite side of said rotor support, a conductive element secured to the projecting portions of said rotor plate so as to make electrical connection therewith and at the same time secure said rotor plate to said rotor support, said conductive element being electrically connected to said shaft, said shaft, arcuate grooves and plates being concentric, the ends of said rotor and stator plates directed toward said stator and rotor supports respectively being slidably received within the grooves in said supports, both the rotor and stator plates thus being fixed in position at both ends, and a terminal electrically connected to the conductive element secured to the projecting portions of said stator plate.

7. The variable capacity condenser of claim 6, in which said shaft extends through and beyond said bushing and in which a resilient element is positioned between said bushing and the tip of the extending portion of said shaft, said resilient element being active on said shaft in such a direction as to urge the rotor support on said shaft toward said bushing.

8. A variable capacity condenser comprising oppositely disposed stator and rotor supports, said rotor support being rotatable relative to said stator support, a partial-cylindrical type stator plate having an arcuate cross section secured to said stator support and extending toward said rotor support, a partial-cylindrical type rotor plate having an arcuate cross section secured to said rotor support and extending toward said stator support adjacent said stator plate, said rotor and stator supports having arcuate grooves in their opposite surfaces in line with said stator and rotor plates respectively, the extending edges of said rotor and stator plates being slidably received within said grooves, both the rotor and stator plates thus being fixed in position at both ends, a cylindrical dust shield between said stator and rotor supports outside said stator and rotor plates, and a resilient element operatively connected to said supports so as to urge them toward one another, said dust shield having a height such as to serve as the primary longitudinal structural element of the condenser, rigidly determining the spacing between said supports and relieving pressure on said stator and rotor plates.

9. A variable capacity condenser comprising oppositely disposed stator and rotor supports, said rotor support being rotatable relative to said stator support, a partial-cylindrical type stator plate having an arcuate cross section secured to said stator support and extending toward said rotor support, a partial-cylindrical type rotor plate having an arcuate cross section secured to said rotor support and extending toward said stator support adjacent said stator plate, the opposing sides of said rotor and stator supports having portions slidably cooperating with the extending edges of said stator and rotor plates respectively so as to prevent vibration or displacement of said extending plate ends while permitting rotation of said rotor plate with respect to said stator plate, a cylindrical dust shield between said stator and rotor supports outside said stator and rotor plates, and a resilient element operatively connected to said supports so as to urge them toward one another, said dust shield having a height such as to serve as the primary longitudinal structural element of the condenser, rigidly determining the spacing between said supports and relieving pressure on said stator and rotor plates.

10. A variable capacity condenser comprising an insulating stator support having an aperture therethrough, a partial-cylindrical type stator plate having an arcuate cross section on one side of said stator support and having a portion projecting through said aperture to the other side of said stator support, a conductive element secured to the projecting portion of said stator plate so as to be electrically connected therewith and at the same time to secure said stator plate to said stator support, a conductive shaft mounted in said stator support, an insulating rotor support on said shaft opposite said stator support and having an aperture therethrough, a partial-cylindrical type rotor plate having an arcuate cross section positioned on one side of said rotor support so as to be adjacent said stator plate and having a projecting portion passing through said aperture to the other side of said rotor support, a conductive element secured to the projecting portion of said rotor plate so as to be electrically connected thereto and at the same time to secure said rotor plate to said rotor support, said conductive element being electrically connected to said shaft, and a terminal non-rotatably mounted on said stator support and electrically connected to said conductive shaft.

11. The variable capacity condenser of claim 10, in which said conductive shaft extends through and beyond said stator support and in which a resilient element is positioned between said stator support and the tip of the extending portion of said shaft, said resilient element being active on said shaft in such a direction as to urge the rotor support on said shaft toward said stator support.

12. A variable capacity condenser comprising an insulating stator support having an arcuate groove on one side thereof, a partial-cylindrical type stator plate having an arcuate cross section secured thereto adjacent said groove, a portion of said stator plate projecting through said stator support to the opposite side thereof, a conductive element secured to said portion, a terminal electrically connected to said conductive element, a conductive shaft mounted in said stator support, an insulating rotor support on said shaft opposite said stator support, a partial-cylindrical type rotor plate having an arcuate cross section secured to said rotor support opposite the groove in said stator support, a portion of said rotor plate projecting through said rotor support, a conductive element connecting said shaft with said portion, a terminal fixedly mounted on said stator support and rotor plates electrically connected to said shaft, and said rotor support having an arcuate groove opposite said stator plate, said shaft, arcuate grooves and plates being concentric, the ends of said rotor and stator plates directed toward said stator and rotor supports respectively being slidably received within the grooves in said supports, both the rotor and stator plates thus being fixed in position at both ends and rendered vibration-resistant, a cylindrical dust shield between said stator and rotor supports outside said stator and rotor plates, and a resilient element operatively connected to said supports so as to urge them toward one another, said dust shield having a height such as to serve as the primary longitudinal structural element of the condenser, rigidly determining the spacing between said supports and relieving pressure on said stator and rotor plates.

13. A variable capacity condenser comprising an insulating stator support having a pair of adjacent arcuate grooves on one side thereof and having apertures extending from one of said grooves through said stator support, a partial-cylindrical type stator plate having an arcuate cross section having projecting portions at one end thereof positioned in said one of said grooves so that said projecting portions extend through said apertures, a conductive element secured to said projecting portions so as to make electrical connection therewith and at the same time secure said stator plate to said stator support, a conductive shaft mounted in said stator support, an insulating rotor support on said shaft opposite said stator support and having a pair of arcuate grooves in the side of said rotor support opposite said stator support and having apertures in one of said grooves extending through said rotor support to the opposite side thereof, said grooves in said rotor support being positioned opposite said grooves in said stator support and the groove in said rotor support from which said apertures extend being opposite the groove in said stator support not provided with apertures, a partial-cylindrical type rotor plate having an arcuate cross section received within the apertured groove in said rotor support and having projecting portions extending through said apertures to the opposite side of said rotor support, a conductive element secured to the projecting portions of said rotor plate so as to make electrical connection therewith and at the same time secure said rotor plate to said rotor support, said conductive element being electrically connected to said shaft, said shaft, arcuate grooves and plates being concentric, the ends of said rotor and stator plates directed toward said stator and rotor supports respectively being slidably received within the grooves in said supports, both the rotor and stator plates thus being fixed in position at both ends and rendered vibration-resistant, a cylindrical dust shield between said stator and rotor supports outside said stator and rotor plates, and a resilient element operatively connected to said supports so as to urge them toward one another, said dust shield having a height such as to serve as the primary longitudinal structural element of the condenser, rigidly determining the spacing between said supports and relieving pressure on said stator and rotor plates.

14. A variable capacity condenser comprising an insulating stator support having a pair of adjacent arcuate grooves on one side thereof and having apertures extending from one of said grooves through said stator support, a partial-cylindrical type stator plate having an arcuate cross section having projecting portions at one end thereof positioned in said one of said grooves so that said projecting portions extend through said apertures, a conductive element secured to said projecting portions so as to make electrical connection therewith and at the same time secure said stator plate to said stator support, a conductive shaft mounted in said stator support, an insulating rotor suport on said shaft opposite said stator support and having a pair of arcuate grooves in the side of said rotor support opposite said stator support and having apertures in one of said grooves extending through said rotor support to the opposite side thereof, said grooves in said rotor support being positioned opposite said grooves in said stator support and the groove in said rotor support from which said apertures extend being opposite the groove in said stator support not provided with apertures, and a partial-cylindrical type rotor plate having an arcuate cross section received within the apertured groove in said rotor support and having projecting portions extending through said apertures to the opposite side of said rotor support, a conductive element secured to the projecting portions of said rotor plate so as to make electrical connection therewith and at the same time secure said rotor plate to said rotor support, said conductive element being electrically connected to said shaft, said shaft, arcuate grooves and plates being concentric, the ends of said rotor and stator plates directed toward said stator and rotor supports respectively being slidably received within the grooves in said supports, both the rotor and stator plates thus being fixed in position at both ends, a terminal secured to the conductive element electrically connected to the projecting portions of said stator plate and a terminal fixedly mounted on said stator support and electrically connected to said conductive shaft but not rotatable therewith, a cylindrical dust shield between said stator and rotor supports outside said stator and rotor plates, and a resilient element operatively connected to said supports so as to urge them toward one another, said dust shield having a height such as to serve as the primary longitudinal structural element of the condenser, rigidly determining the spacing between said supports and relieving pressure on said stator and rotor plates.

15. A variable capacity condenser comprising an insulating stator support having a pair of adjacent arcuate grooves on one side thereof and having apertures extending from one of said grooves through said stator support, a partial-cylindrical type stator plate having an arcuate cross section having projecting portions at one end thereof positioned in said one of said grooves so that said projecting portions extend through said apertures, a conductive element secured to said projecting portions so as to make electrical connection therewith and at the same time secure said stator plate to said stator support, a conductive bushing non-rotatably secured to said stator support, a terminal fixedly mounted on said stator support and electrically connected to said bushing, a conductive shaft mounted in said bushing, an insulating rotor support on said shaft and having a pair of arcuate grooves in the side of said rotor support opposite said stator support and having apertures in one of said grooves extending said rotor support to the opposite side thereof, said grooves in said rotor support being positioned opposite said grooves in said stator support and the groove in said rotor support from which said apertures extend being opposite the groove in said stator support not provided with apertures, an arcuate rotor plate having an arcuate cross section received within the apertured groove in said rotor support and having projecting portions extending through said apertures to the opposite side of said rotor support, a conductive element secured to the projecting portions of said rotor plate so as to make electrical connection therewith and at the same time secure said rotor plate to said rotor support, said conductive element being electrically connected to said shaft, said shaft, arcuate grooves and plates being concentric, the ends of said rotor and stator plates directed toward said stator and rotor supports respectively being slidably received within the grooves in said supports, both the rotor and stator plates thus being fixed in position at both ends, and a terminal electrically connected to the conductive element secured to the projecting portions of said stator plate, a cylindrical dust shield between said stator and rotor supports outside said stator and rotor plates, and a resilient element operatively connected to said supports so as to urge them toward one another, said dust shield having a height such as to serve as the primary longitudinal structural element of the condenser, rigidly determining the spacing between said supports and relieving pressure on said stator and rotor plates.

16. A variable capacity condenser comprising an insulating stator support having an aperture therethrough, a partial-cylindrical type stator plate having an arcuate cross section on one side of said stator support and having a portion projecting through said aperture to the other side of said stator support, a conductive element secured to the projecting portion of said stator plate so as to be electrically connected therewith and at the same time to secure said stator plate to said stator support, a conductive shaft mounted in said stator support, an insulating rotor support on said shaft opposite said stator support and having an aperture therethrough, a partial-cylindrical type rotor plate having an arcuate cross section positioned on one side of said rotor support so as to be interleave with said stator plate and having a projecting portion passing through said aperture to the other side of said rotor support, a conductive element secured to the projecting portion of said rotor plate so as to be electrically connected thereto and at the same time to secure said rotor plate to said rotor support, said conductive element being electrically connected to said shaft, and a terminal non-rotatably mounted on said stator support and electrically connected to said conductive shaft, a cylindrical dust shield between said stator and rotor supports outside said stator and rotor plates, and a resilient element operatively connected to said supports so as to urge them toward one another, said dust shield having a height such as to serve as the primary longitudinal structural element of the condenser, rigidly determining the spacing between said supports and relieving pressure on said stator and rotor plates.

ADOLPH E. GERSCH.

REFERENCES CITED

The following references are of record in the file of this patent:

UNITED STATES PATENTS

| Number | Name | Date |
| --- | --- | --- |
| 1,593,033 | Proudfoot | July 20, 1926 |
| 2,010,584 | Cramer | Aug. 6, 1935 |
| 2,225,770 | Dorn | Dec. 24, 1940 |

FOREIGN PATENTS

| Number | Country | Date |
| --- | --- | --- |
| 642,489 | France | Aug. 29, 1928 |